US012754166B2

(12) United States Patent
Bedford et al.

(10) Patent No.: US 12,754,166 B2
(45) Date of Patent: Oct. 6, 2026

(54) SYSTEMS AND METHODS FOR PERFORMING A CHECK OF A DIFFERENTIAL MOBILITY SPECTROMETER

(71) Applicant: DH Technologies Development Pte. Ltd., Singapore (SG)

(72) Inventors: Leigh Bedford, Whitby (CA); Bradley B. Schneider, Bradford (CA); Eva Duchoslav, Toronto (CA); Stephen Tate, Barrie (CA)

(73) Assignee: DH Technologies Development Pte. Ltd., Singapore (SG)

( * ) Notice: Subject to any disclaimer, the term of this patent is extended or adjusted under 35 U.S.C. 154(b) by 371 days.

(21) Appl. No.: 18/561,031

(22) PCT Filed: May 18, 2022

(86) PCT No.: PCT/IB2022/054620
§ 371 (c)(1),
(2) Date: Nov. 15, 2023

(87) PCT Pub. No.: WO2022/243896
PCT Pub. Date: Nov. 24, 2022

(65) Prior Publication Data

US 2024/0255467 A1 Aug. 1, 2024

Related U.S. Application Data

(60) Provisional application No. 63/190,479, filed on May 19, 2021.

(51) Int. Cl.

| | |
|---|---|
| ***G01N 27/623*** | (2021.01) |
| ***G01N 27/624*** | (2021.01) |
| ***H01J 49/16*** | (2006.01) |

(52) U.S. Cl.
CPC ......... *G01N 27/623* (2021.01); *G01N 27/624* (2013.01); *H01J 49/165* (2013.01)

(58) Field of Classification Search
CPC .... G01N 27/623; G01N 27/624; H01J 49/165
See application file for complete search history.

(56) References Cited

U.S. PATENT DOCUMENTS

| | | | |
|---|---|---|---|
| 6,593,568 | B1 | 7/2003 | Whitehouse et al. |
| 7,923,681 | B2 | 4/2011 | Collings et al. |

(Continued)

FOREIGN PATENT DOCUMENTS

| | | |
|---|---|---|
| WO | 2009/143616 | 12/2009 |
| WO | 2009/143623 | 12/2009 |

(Continued)

OTHER PUBLICATIONS

Barnett et al., "Characterization of a temperature-controlled FAIMS system", Journal of the American Society for Mass Spectrometry, Elsevier, vol. 18, No. 9, Aug. 25, 2007, pp. 1653-1663.

(Continued)

*Primary Examiner* — Georgia Y Epps
*Assistant Examiner* — Hanway Chang

(57) ABSTRACT

A method of operating a system including a differential mobility spectrometer (DMS) and a mass spectrometer. A sample is introduced to the DMS. The sample is analyzed with the DMS. Data is generated based at least in part on an analyte ion generated from the sample and at least one transport gas composition. Library data of the analyte ion is accessed from a library. The generated data is compared to the library data. A signal is sent when the generated data deviates from the library data by more than a predetermined threshold.

20 Claims, 11 Drawing Sheets

(56) References Cited

U.S. PATENT DOCUMENTS

| | | | |
|---|---|---|---|
| 9,305,762 B2 | 4/2016 | Covey | |
| 9,425,031 B2 | 8/2016 | Schneider | |
| 9,846,143 B2 | 12/2017 | Blagojevic | |
| 10,276,358 B2 | 4/2019 | Wu | |
| 10,770,277 B2 | 9/2020 | Datwani et al. | |
| 2003/0052263 A1 | 3/2003 | Kaufman et al. | |
| 2003/0062474 A1 | 4/2003 | Baranov et al. | |
| 2004/0206901 A1 | 10/2004 | Chen | |
| 2005/0029449 A1 | 2/2005 | Miller | |
| 2005/0040330 A1* | 2/2005 | Kaufman | G01N 27/624 250/293 |
| 2005/0178964 A1 | 8/2005 | Guevremont et al. | |
| 2005/0194532 A1 | 9/2005 | Guevremont | |
| 2006/0124846 A1 | 6/2006 | Covey | |
| 2008/0073502 A1 | 3/2008 | Schneider | |
| 2009/0152458 A1 | 6/2009 | Vilkov et al. | |
| 2009/0294648 A1 | 12/2009 | Schneider | |
| 2009/0294650 A1 | 12/2009 | Schneider | |
| 2010/0237233 A1 | 9/2010 | Covey | |
| 2010/0282966 A1 | 11/2010 | Schneider et al. | |
| 2011/0183431 A1 | 7/2011 | Covey | |
| 2014/0339416 A1 | 11/2014 | Vidal-De-Miguel et al. | |
| 2016/0118234 A1 | 4/2016 | Covey | |
| 2016/0187296 A1 | 6/2016 | Blagojevic | |
| 2017/0053789 A1 | 2/2017 | Allsworth | |
| 2018/0269048 A1 | 9/2018 | Jarvis | |
| 2019/0086363 A1 | 3/2019 | Covey | |
| 2019/0157060 A1 | 5/2019 | Datwani | |
| 2021/0005441 A1 | 1/2021 | Booy | |
| 2021/0366699 A1 | 11/2021 | Campbell et al. | |
| 2023/0176010 A1 | 6/2023 | Covey | |
| 2023/0288372 A1 | 9/2023 | Leigh | |
| 2024/0085373 A1 | 3/2024 | Campbell et al. | |
| 2024/0175846 A1 | 5/2024 | Covey | |

FOREIGN PATENT DOCUMENTS

| | | |
|---|---|---|
| WO | 2012/167254 | 12/2012 |
| WO | 2013/171571 | 11/2013 |
| WO | 2015/022573 | 2/2015 |
| WO | 2016/108126 | 7/2016 |
| WO | 2017/093898 | 6/2017 |
| WO | 2017/158534 | 9/2017 |
| WO | 2021/156775 | 8/2021 |
| WO | 2022/201038 | 9/2022 |
| WO | 2022/269517 | 12/2022 |
| WO | 2023/119062 | 6/2023 |

OTHER PUBLICATIONS

Cumeras, R. et al., "Review on lon Mobility Spectrometry. Part 1: Current Instrumentation", Analyst, vol. 140, No. 5, Jan. 1, 2015, pp. 1376-1390.

Hager et al., Product ion scanning using a Q-q-Q linear ion trap (Q Trap) mass spectrometer, Rapid Communications in Mass Spectrometry (2003; 17: 1056-1064).

Ieritano, Christina et al., "Determining Collision Cross Sections from Differential Ion Mobility Spectrometry", Analytical Chemistry, vol. 93, No. 25, Jun. 29, 2021, pp. 8937-8944.

Krylov et al., "Temperature effects in differential mobility spectrometry", International Journal of Mass Spectrometry, Elsevier, vol. 279, No. 2-3, Jan. 15, 2009, pp. 119-125.

PCT International Preliminary Report on Patentability in International Application PCT/IB2022/054620, mailed 11/330/2023, 10 pages.

PCT International Search Report and Written opinion in International Application PCT/IB2022/054620, mailed Aug. 30, 2022, 18 pages.

Porta et al., "Gas-phase separation of Drugs and Metabolites using Modifier-Assisted Differentail Ion Mobiliity Spectrometry Hyphenated to Liquid Extraction Surface Analysis and Mass Spectrometry", Anal. Chem., 2013, 85, 24, 11771-11779.

Rajapaske et al., "Automated chemical identification and library building using dispersion plots for differentail mobility spectrometry", Analytical Methods, vol. 10, No. 35, Jan. 1, 2018, pp. 4339-4349.

Schnedier et al., "DMS-MS Separations with Different Transport Gas Modifiers", Int. J. Ion Mobile. Spec (2013) 16: 207-2016.

Schneider et al., "Chemical Effects in the Separation Process of a DMS/MS System", Anal. Chem. 2010, 82, 1867-1880.

Schneider et al., "Differential Mobility Spectrometry/Mass Spectrometry History, Theory, Design Optimization, Simulations, and Applications", Mass Spectrom Rev, 2016, 35(6): 687-737.

Wei et al., "Effects of Solvent Vapor Modifiers for the Separation of Opiod Isomers in Micromachined FAIMS-MS", J. Am. Soc. Mass Spectrom. (2019) 30: 731-742.

* cited by examiner

SYSTEMS AND METHODS FOR PERFORMING A CHECK OF A DIFFERENTIAL MOBILITY SPECTROMETER

CROSS-REFERENCE TO RELATED APPLICATION

This application is a National Stage Application of PCT/IB2022/054620, filed on May 18, 2022, which claims the benefit of U.S. Provisional Application No. 63/190,479, filed on May 19, 2021, the entire disclosures of which are incorporated herein by reference in their entireties. To the extent appropriate, a claim of priority is made to each of the above disclosed applications.

BACKGROUND

Mass spectrometry (MS) based analysis methods can achieve label-free, universal mass detection of a wide range of analytes with exceptional sensitivity, selectivity, and specificity. As a result, there is significant interest in improving the throughput of MS-based analysis for many applications. In particular, a number of sample introduction systems for MS-based analysis have been improved to provide higher throughput. Acoustic droplet ejection (ADE) has been combined with an open port interface (OPI) to provide a sample introduction system for high-throughput mass spectrometry. The sample is ejected from electrospray ionization (ESI) source and analyzed by a differential mobility spectrometer (DMS). Some MS systems can analyze samples at a rate of approximately 1 Hz, enabling analysis of a full 384 well plate in less than 7 minutes. This approach is not compatible with standard chromatography approaches and may be limited by the presence of isobaric interferences. DMS may be coupled with ADE and OPI to enable high throughput testing, while removing potential background noise and isobaric interferences.

SUMMARY

In one aspect, the technology relates to a method of operating a system including a differential mobility spectrometer (DMS) and a mass spectrometer, the method including: introducing a sample to the DMS; analyzing the sample with the DMS; generating data based at least in part on an analyte ion generated from the sample and at least one transport gas composition; accessing library data of the analyte ion from a library; comparing the generated data to the library data; and sending a signal when the generated data deviates from the library data by more than a predetermined threshold. In an example, analyzing the sample includes: setting a separation voltage (SV) of the DMS; adjusting a compensation voltage (CoV) of the DMS; and while adjusting the CoV, concurrently monitoring an analytical signal from the DMS, wherein the generated data is based at least in part on monitoring the analytical signal. In another example, generating data includes generating a sample plot for each of a plurality of different separation voltage settings of the DMS, wherein each sample plot includes a mass spectrometer signal intensity versus the CoV. In yet another example, accessing library data includes accessing a library alpha plot for the analyte ion at a predetermined transport gas condition. In still another example, comparing the generated data to the library data includes: transforming the sample plots into an experimental alpha plot; and comparing the experimental alpha plot to the library alpha plot.

In another example of the above aspect, the predetermined threshold is a maximum absolute alpha difference between the experimental alpha plot and the library alpha plot such that a shift in CoV space is less than about 0.8 V0.4 V. In an example, the predetermined threshold is a maximum absolute alpha difference between the experimental alpha plot and the library alpha plot such that a shift in CoV space is less than about 0.4 V. In another example, the method further includes ejecting the sample with a droplet ejector into an open port interface (OPI); and aspirating the sample from the OPI to the ionization source.

In another aspect, the technology relates to a system for analyzing a sample, the system including: a sample ejector for ejecting a standard sample from a sample source; an open port interface (OPI) for receiving the ejected sample; an ionization source communicatively coupled to the OPI; a differential mobility spectrometer (DMS) disposed proximate the ionization source, wherein the ionization source is configured to deliver the sample to the DMS; a mass spectrometer (MS); a processor; and memory storing instructions that, when executed by the processor, cause the system to perform operations including: introducing the standard sample to the DMS; analyzing the standard sample with the DMS; generating data based at least in part on an analyte ion generated from the standard sample and at least one transport gas composition; accessing library data of the analyte ion from a library; comparing the generated data to the library data; and sending a signal when the generated data deviates from the library data by more than a predetermined threshold. In an example, the sample ejector includes an acoustic droplet ejector (ADE) and wherein the ADE is configured to eject a plurality of subject samples from the sample source. In another example, the operations further include mass analyzing each of the plurality of ejected subject samples with a mass spectrometer (MS) prior to introducing the standard sample to the DMS. In yet another example, the operations further include: ejecting a first subset of the plurality of subject samples from the sample source prior to introducing the standard sample to the DMS; mass analyzing the first subset of the plurality of ejected subject samples with the MS prior to introducing the standard sample to the DMS; ejecting a second subset of the plurality of subject samples from the sample source subsequent to introducing the standard sample to the DMS; and terminating ejection of the second subset of the plurality of subject samples based at least in part on the sending of the signal. In still another example, the operations further include: ejecting the plurality of subject samples from the sample source subsequent to introducing the standard sample to the DMS; and terminating ejection of at least a subset of the plurality of subject samples based at least in part on the sending of the signal.

In another example of the above aspect, the ionization source includes an electrospray ionization source (ESI). In an example, the memory includes the library. In another example, the sample source includes a sample plate including a plurality of wells, and wherein the standard sample is disposed in a standard well of the plurality of wells. In yet another example, the system further includes receiving an identification signal associated with the standard well.

In another aspect, the technology relates to 1 method of operating a system including a differential mobility spectrometer (DMS) and a mass spectrometer, the method including: generating a standard sample alpha curve based at least in part on an analyte ion generated from a standard sample and at least one transport gas composition; comparing the standard sample alpha curve to a known alpha curve; and sending an operational condition signal based at least in part on the comparison. In an example, the operational condition signal includes a warning. In another example, the operational condition signal initiates an introduction of a subject sample to the DMS.

DETAILED DESCRIPTION

Figure 1:
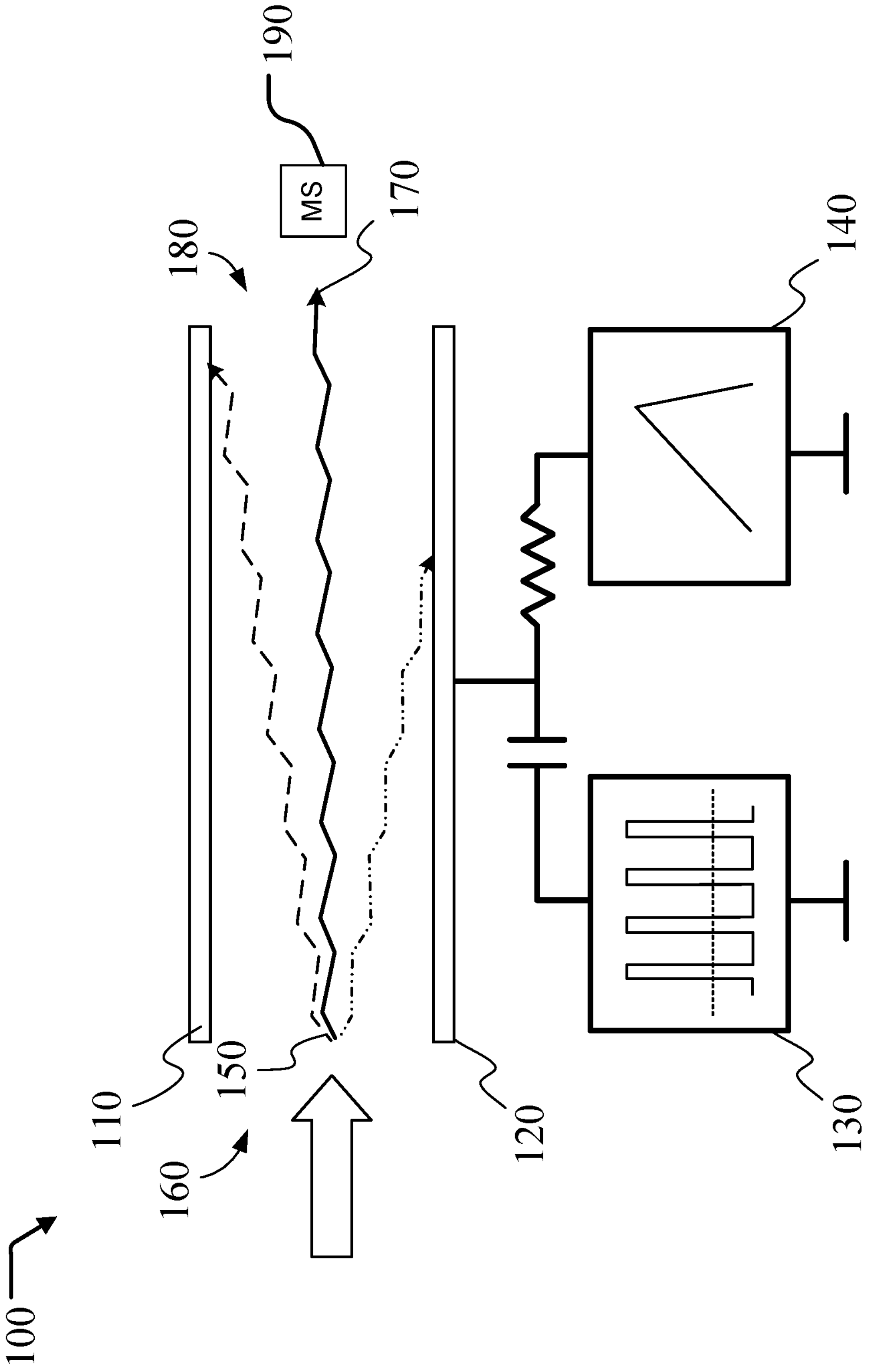
FIG. 1 is a schematic diagram of an exemplary differential mobility spectrometry (DMS) device.

MS systems may include functionality in hardware, software, or combinations thereof, that may be used to characterize the differential mobility behavior for a given ion through determination of that ion's alpha function. The alpha function in a DMS is the normalized difference between an ion's high and low field mobility and can be determined for a given ion using, e.g., the procedure described by Schneider et al., (BB Schneider et al., Mass Spectrom Rev, 2016, 35(6):687-737), the disclosure of which is incorporated by reference herein in its entirety. Such systems may store and save alpha curves generated under various conditions to build a library, and this information can be used to set the optimal conditions for analysis of a given ion. Additional functionality of such systems include comparing alpha curves for multiple compounds to generate a "difference" function, and by determining the global maximum in the difference function for various compounds, selecting the separation field that provides the best possible separation for multiple compounds in the library. Once the library data is generated, it may be determined if it is possible to separate two compounds and what would be the best conditions for any given compound.

The technologies described herein involve generating alpha data for compounds of interest and storing the data in the library. As sample plates are loaded on the ADE, the user may define which targeted compounds to look for in the various wells and the system software defines the critical method parameters such as separation voltage (SV)/CoV combinations. One potential concern with this approach is that the alpha function is sensitive to conditions such as type and flow of modifiers, waveform calibration, DMS temperature, and DMS gap height. Changes to any of these parameters resulting from either human error, drift, or component damage will dramatically change the optimal SV/CoV combination. Some examples of where this can be important include 1) improper assembly of the DMS cell after cleaning, 2) contamination of the modifier liquid during refilling, 3) changes in the transport gas composition due to gas pressure fluctuation, or 4) hardware issues with the separation waveform generator, heater, or modifier pumping system. As a worst-case scenario, any of these issues could dramatically shift the CoV location for a peak of interest relative to the predicted location from the stored alpha curve, and this can result in no signal for a compound of interest. Given the extreme analysis speed capability of an MS system that utilizes high throughput ADE/OPI sample introduction system, it would be easy to run through hundreds or thousands of samples without realizing that the system is improperly tuned. Therefore, it is critical to this approach to provide a suitability check that is conducted with a periodic interval.

The technologies described herein define, create, and implement a system suitability test that may be performed at any time during analysis of a well plate. The system suitability test may be run with a pre-defined interval. As a first example, the system suitability test may be run any time a plate is changed on the ADE system. This is an extreme example given that plate change times can be shorter than 10 min for a 384 well plate running at a rate of 1 Hz. It will be understood that other intervals may also be used for the system suitability test, including once an hour, once a day, or any time it is desirable to screen for a different analyte.

In examples, the technologies described herein may include loading a well plate with both standard and subject samples for analysis. As used herein, the term "standard sample" is a known sample used to perform the described suitability test, while a "subject sample" is a sample on which it is desired to perform a particular analysis. The OPI is run in pseudo-continuous mode with a user-defined method that sets the DMS SV to a particular value or values to enable differential mobility separation, and the CoV is ramped over a pre-defined range while monitoring the analytical signal within the mass spectrometer. A series of ionogram plots (signal intensity vs CoV) are generated for the standard sample contained in a standard well, which can be compared to previously acquired alpha or CoV data that has been stored in the compound library or data store. The system will compare the alpha or CoV data, and if the newly acquired data from the standard well sample is within an acceptable deviation window from the library, the suitability test will be defined as a pass and the system can proceed to analyzing samples. The system may also allow the new alpha data to be added to the current library. If the alpha or CoV is not within an acceptable deviation window, an error will be generated to alert the user prior to running additional subject samples. One aspect to this approach is properly defining the pass/fail criteria for the system suitability test, and these criteria may differ depending upon whether the Echo/DMS system is used for quantitative or qualitative analysis.

FIG. 1 is a schematic diagram of an exemplary DMS device 100. DMS device 100 includes two parallel flat plates, plate 110 and plate 120. Radio frequency (RF) voltage source 130 applies an RF separation voltage (SV) between plate 110 and plate 120, and direct current (DC) voltage source 140 applies a DC compensation voltage (CoV) between plate 110 and plate 120. Ions 150 enter DMS device 100 in a transport gas at opening 160. Unlike traditional ion mobility, ions 150 are not separated in time as they traverse the device. Instead, ions 150 are separated in trajectory based on the difference in their mobility between the high field and low field portions of applied RF voltage source 130. The high field is applied between plate 110 and plate 120 for a short period of time, and then a low field is applied with the opposite polarity for a longer period of time. Any difference between the low-field and high-field mobility of an ion of a compound of interest causes it to migrate towards one of the plates. The ion is steered back towards the center-line of the device by the application of a second voltage offset, known as the CoV of DC voltage source 140, a compound-specific parameter that can be used to filter out other ions selectively. Rapid switching of the CoV allows the device 100 to monitor many different compounds concurrently. Ions 170 selected by the combination of SV and CoV leave DMS device 100 through opening 180 to the remainder of the mass spectrometer 190. DMS device 100 is located between an ion source device (not shown) and the remainder of the mass spectrometer 190, for example.

In general, DMS device 100 has two modes of operation. In the first mode, DMS device 100 is on, SV and CoV voltages are applied, and ions are separated. This is, for example, the enabled mode. In the second mode of operation, DMS device 100 is off, the SV is set to zero and ions 150 are simply transported from opening 160 to opening 180. This is, for example, the disabled or transparent mode of DMS device 100. In the enabled mode, DMS device 100 can acquire data for a single MRM transition in about 15-20 milliseconds (ms), for example, including an inter-scan pause time of about 10-15 ms. In transparent mode, the delay through DMS device 100 is negligible.

Figure 2:
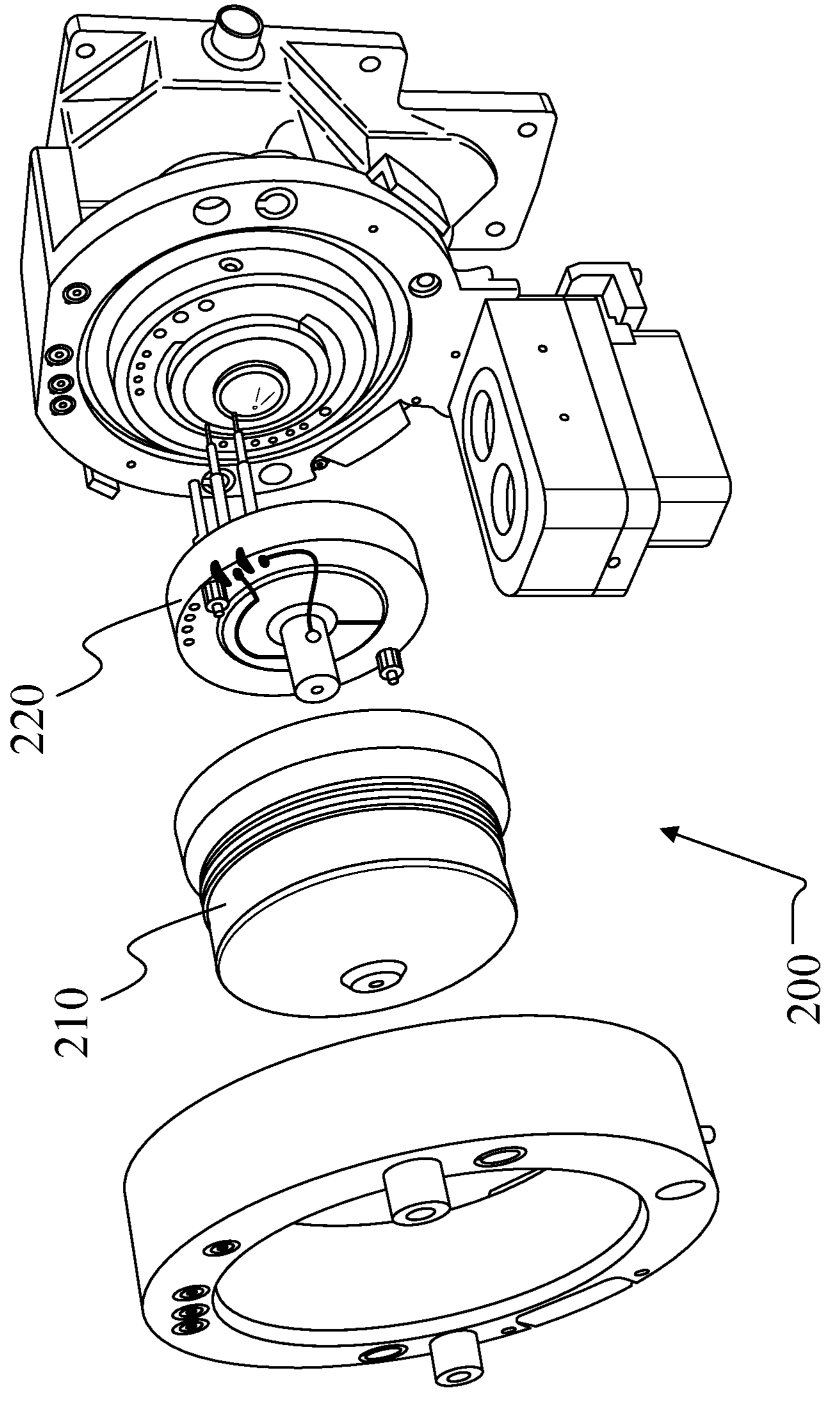
FIG. 2 is an exemplary three-dimensional (3D) exploded image of a DMS device, in accordance with various examples.

FIG. 2 is an exemplary three-dimensional (3D) exploded image of a DMS device 200, in accordance with various examples. Specifically, the SELEXION+ DMS device produced by SCIEX of Framingham, MA is depicted. This DMS device includes cylindrical curtain plate 210, which surrounds DMS cell 220.

Figure 3:
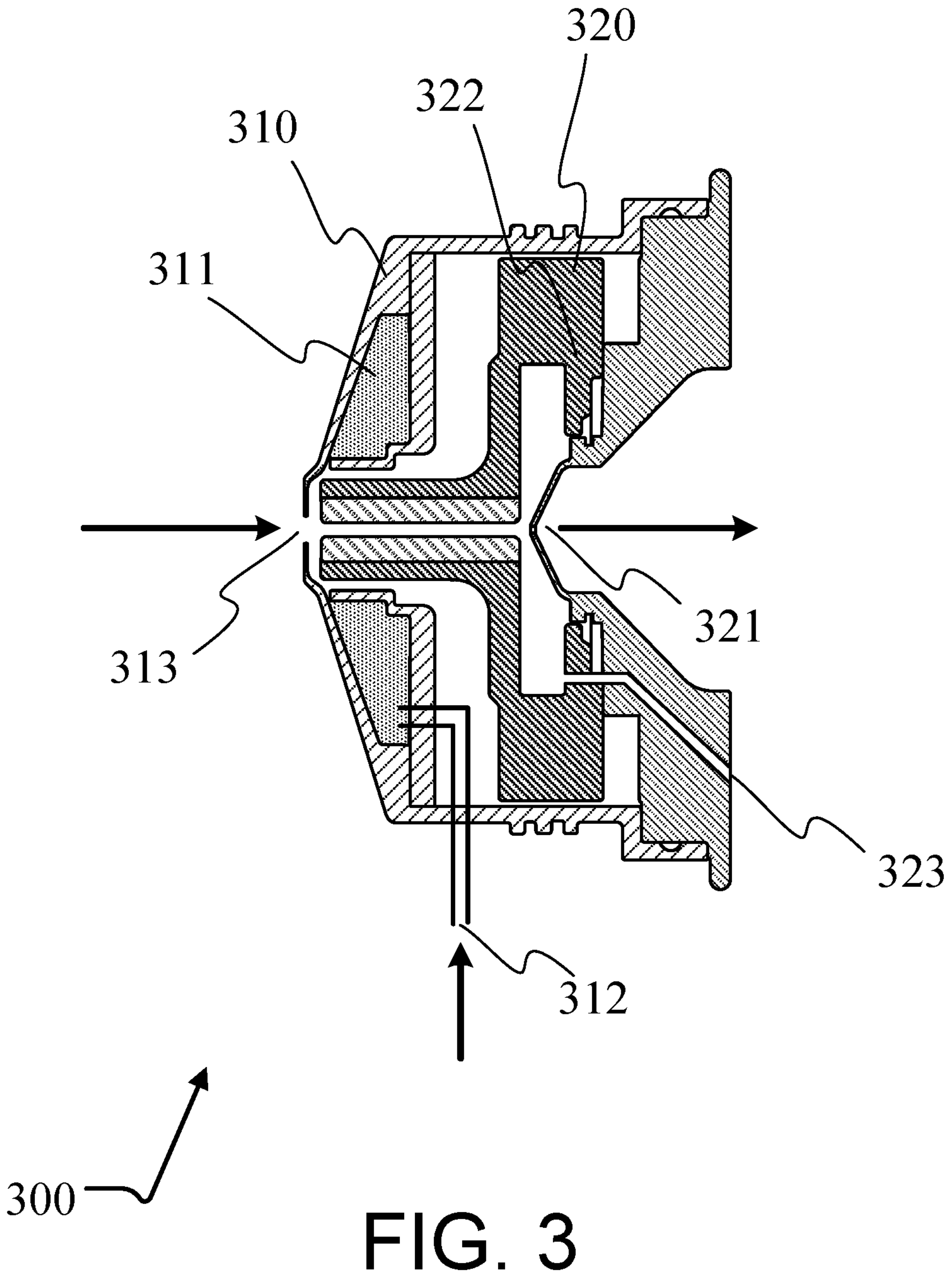
FIG. 3 is an exemplary two-dimensional (2D) cross-sectional diagram of a DMS device, in accordance with various examples.

FIG. 3 is an exemplary two-dimensional (2D) cross-sectional diagram of a DMS device 300, in accordance with various examples. In FIG. 3, the DMS device 300 includes curtain plate 310 and DMS cell 320. Curtain plate 310 may include ceramic beads 311 which act as a heat exchanger, for example. Curtain plate 310 receives a curtain gas, which can be, but is not limited to, nitrogen ($N_2$), through port 312. One of several chemical modifiers, as known in the art, is added to the curtain gas and also enters curtain plate 310 through port 312. Chemical modifiers alter the differential mobility behavior for a given ion via the dynamic cluster/decluster mechanism. Clustering of modifiers with a given ion during the low field portion of the waveform decrease the ion mobility. During the high field portion of the waveform, ions acquire sufficient internal energy to at least partially decluster. This amplifies the difference between the high and low field mobility for a given ion and dramatically increases the peak capacity for DMS separations. Since the interactions and clustering between a given modifier and an analyte ion are compound dependent, this imparts chemistry to the selectivity process. Residual clusters from the modifier typically dissociate as the ions are transported to the mass analyzer.

Ions derived from the sample pass into an entrance orifice 313 and through DMS cell 320. The CoV value of DMS cell 320 is ramped as the ions are passing through DMS cell 320. A mass spectrometer (not shown) located at exit orifice 321 of DMS cell 320 selects at least one ion derived from the sample and mass analyzes the at least one ion at each of the different CoV values applied to DMS cell 320. The CoV value that produces the highest intensity for the at least one ion is compared to a known CoV value or range of known CoV values that are known to produce the highest intensity for the at least one ion. The system 300 may include additional heaters for the vacuum inlet (heater 322), in front of the DMS in the region with the ceramic beads 311, in the source region, or in other locations. DMS cell 320 receives a throttle gas, which can be, but is not limited to, nitrogen ($N_2$), through port 323.

Figure 4:
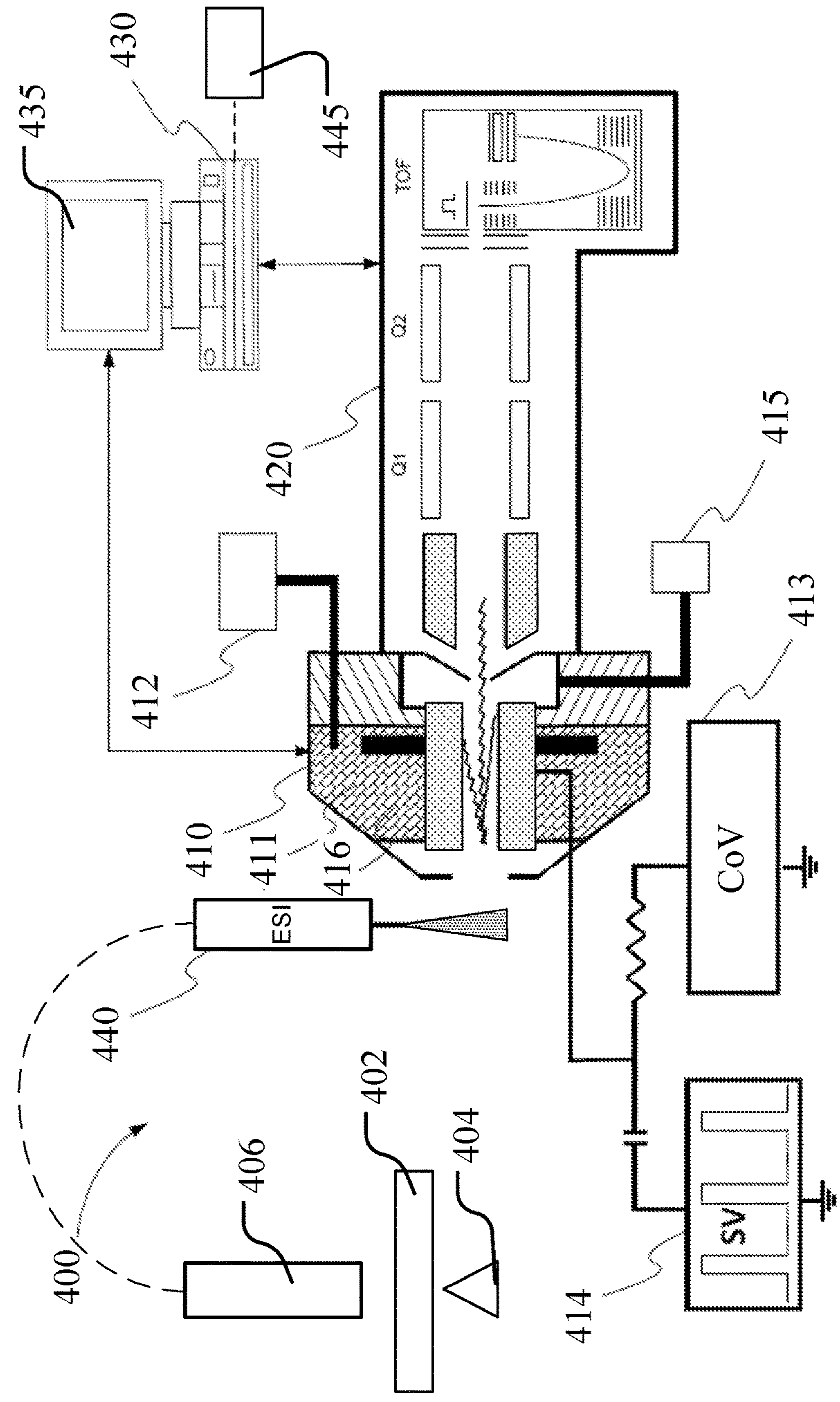
FIG. 4 is a schematic diagram of a system including an ADE/OPI with a DMS and an MS.

FIG. 4 is a schematic diagram of a system 400 including a DMS and an MS. Methods described herein are used to determine if such a system 400 is suitable for performing an analysis. The system of FIG. 4 includes DMS device 410, mass spectrometer 420, and processor 430. Samples are ejected from a well plate 402 with an ADE 404. The samples are received in an OPI, where they are aspirated towards an ESI 440. The samples are ionized, to be further processed and analyzed by the DMS 410 and MS 420. These components are well-known in the art and are described, for example, in U.S. Pat. No. 10,770,277, the disclosure of which is hereby incorporated by reference herein in its entirety. DMS 410 may include a curtain plate 411 and curtain assembly 416. DMS device 410 receives a curtain gas that includes a chemical modifier into curtain plate 411. The curtain gas and the chemical modifier are received from reservoir 412, for example. DMS 410 also receives a throttle gas, e.g., from a reservoir 415.

Before or while receiving ions of an analyte, DMS 410 performs a diagnostic experiment in which CoV 413 of DMS 410 is stepped through a series of values in order to apply different CoV values to at least one precursor ion. SV 414 of DMS device 410 is held constant, for example. Also during the diagnostic experiment, for each CoV value of the series of values, mass spectrometer 420 selects the at least one precursor ion and mass analyzes the at least one precursor ion, producing an intensity for each CoV value of the series of values for the at least one precursor ion. Mass spectrometer 420 is shown in FIG. 4 as a quadrupole time-of-flight (QTOF) device. A QTOF device can obtain a mass spectrum for each CoV value of the series of values, for example. However, MS 420 can be any type of mass spectrometer including, but not limited to, a single quadrupole, triple quadrupole (QqQ), trap, and hybrid analyzers. A QqQ device, for example, can perform a multiple reaction monitoring (MRM) analysis during acquisition of each CoV ramp or ionogram.

In various examples, system 400 further includes a display device 435 to provide information to a user of DMS 410 and MS 420 about the status of DMS 410. If it is determined that the DMS 410 is not suitable for operation, the display device 435 may emit a visible signal to the effect. Audible signals may also be used. In various examples, if the absolute value of the difference in a standard sample alpha curve and the alpha curve obtained from a library 445 is smaller than pre-defined value, the DMS 410 is suitable. A signal consistent therewith may then be displayed or emitted. In various examples, system 400 further includes ion source 440. Ion source 440 is used to ionize an analyte sample. Ion source 440 is shown as performing electrospray ionization (ESI) (e.g., nanospray) but can be any type of ion source that is suitable for use with OPI, including a heated nebulizer atmospheric pressure chemical ionization source (APCI). As described above, the diagnostic experiment can be performed before or during analysis of an analyte of subject sample.

In various examples, processor 430 is used to control or provide instructions to DMS 410 and MS 420 and to analyze data collected. Processor 430 controls or provides instructions by, for example, controlling one or more voltage, current, or pressure sources (not shown). Processor 430 can be a separate device as shown in FIG. 4 or can be a processor or controller of one or more devices of MS 420, for example. Processor 430 can be, but is not limited to, a controller, a computer, a microprocessor, or any device capable of sending and receiving control signals and data. Sample library 445 may be integral with the processor 430 or disposed remote therefrom.

Figure 5:
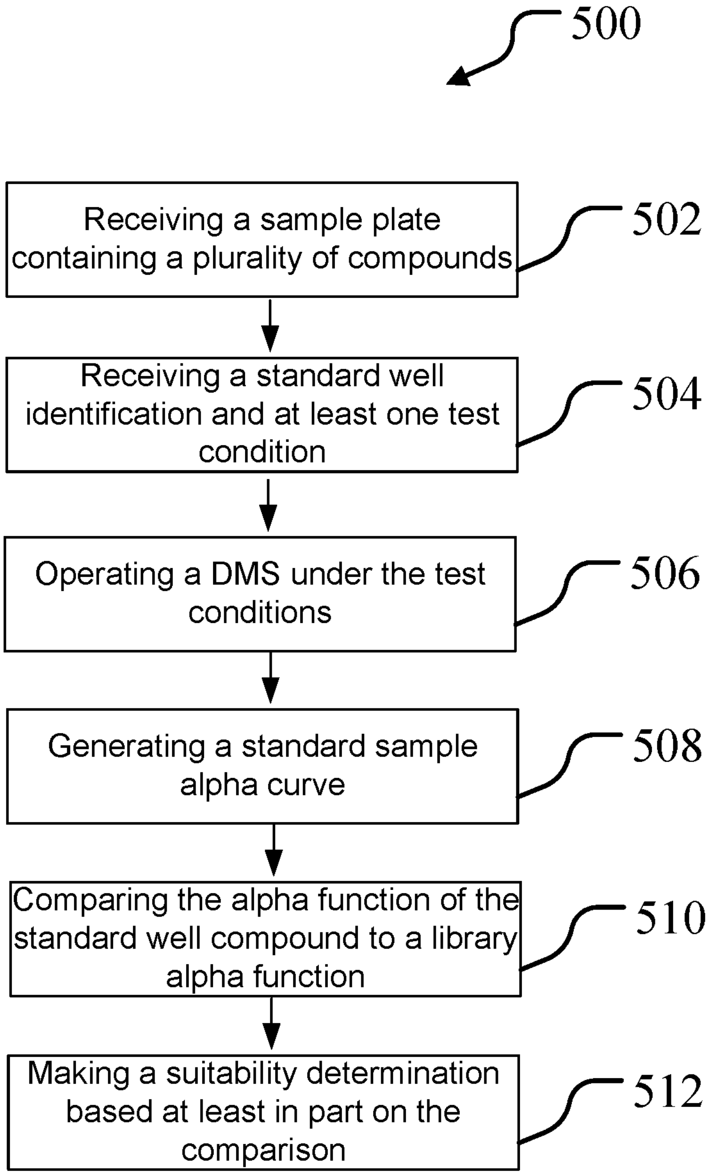
FIG. 5 depicts a method of determining an operational suitability for a DMS.

FIG. 5 depicts a method 500 of determining an operational suitability for a DMS and a mass spectrometer. The method 500 begins with operation 502, receiving a sample plate containing a plurality of compounds. Each compound is contained within a discrete well of the sample plate. The sample may be received in the MS system, which includes a DMS, MS, a sample introduction system such as an ADE, OPI, and an ESI, as described elsewhere herein. Flow continues to operation 504, receiving a standard well identification and at least one standard well condition. A standard well, in this context, is a well within the well plate that contains a standard sample compound, as identified by a user of the DMS system (e.g., the technician loading the well plate into the ADE). In addition to identification of the standard sample compound, the user may also enter one or more test conditions, or such conditions may automatically be associated with the standard sample compound. The conditions may include, but are not limited to, CoV setting, SV setting, mass spectrometer setting, modifier required, or other DMS conditions to use in a given test of the standard sample. The DMS may then be operated under these conditions, operation 506 and the standard sample introduced thereto.

Next, a standard sample alpha curve is generated, operation 508. The standard sample alpha curve is based at least in part on an analyte ion generated from the standard sample tested in operation 506 and a transport gas composition. This standard sample alpha function is then compared to the alpha function of a known compound that is the same as the standard sample compound in the standard well, operation 510. The known compound alpha function may be obtained from a library of such functions for a plurality of various compounds. Based on that comparison, an operational condition signal may be sent, operation 512. In examples, if the standard sample alpha function does not deviate significantly from the known compound alpha function obtained from the library, the DMS is determined to be operating properly. Such a determination may result in some type of positive action being performed by the DMS (e.g., indicating the system is calibrated or suitable for operation). Such an action may include performing analysis of the remaining subject samples in the well plate. In a different example, a warning may be sent (e.g., in the form of an audible or visible signal) if the alpha functions deviate unacceptably. In addition to the warning, the controller may halt an analysis or batch of analyses if the alpha functions deviate unacceptably.

Figure 6:
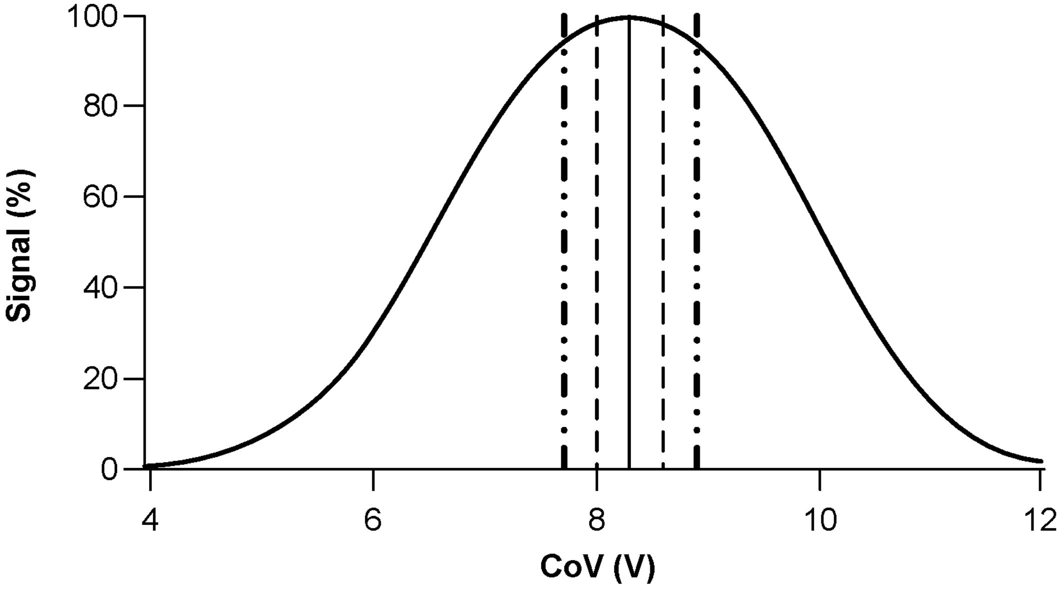
FIGS. 6 and 6A depict plots of a DMS compensation voltage (CoV) ramp for a standard compound.
Figure 6A:
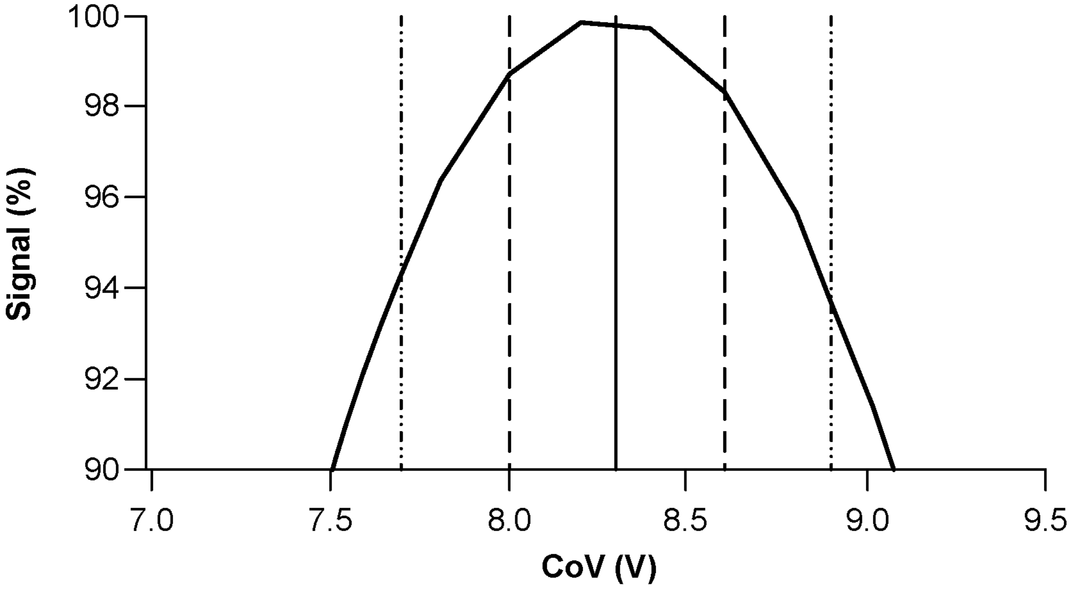

Comparison of the standard sample alpha function and the library alpha function is described below. A system performing this comparison may determine an acceptable deviation between the two alpha functions in order to make a determination as to DMS suitability. FIGS. 6 and 6A depict plots of a DMS CoV ramp for a standard compound, with FIG. 6A depicting the portion of the plot of FIG. 6 between 90 and 100% of the signal. Both plots are described concurrently and show a typical ionogram acquired using open resolution for a compound with approximately 3.6 V FWHM, without the use of a chemical modifier. The solid vertical line depicts the CoV at 100% of the signal and represents the center of the peak. Dashed lines are depicted on either side of the solid line, at an absolute value deviation of 0.3 V therefrom and demonstrate signal reduction that would be expected for a 0.3 V shift from the peak center (about 2% reduction). Further deviation is depicted by the dotted lines at an absolute value deviation of 0.6 V from the peak center. Even under these conditions, the maximum shift of 0.6 V results in a signal reduction of only about 6% to about 7%, which is negligible in the ability to detect the signal.

Figure 7:
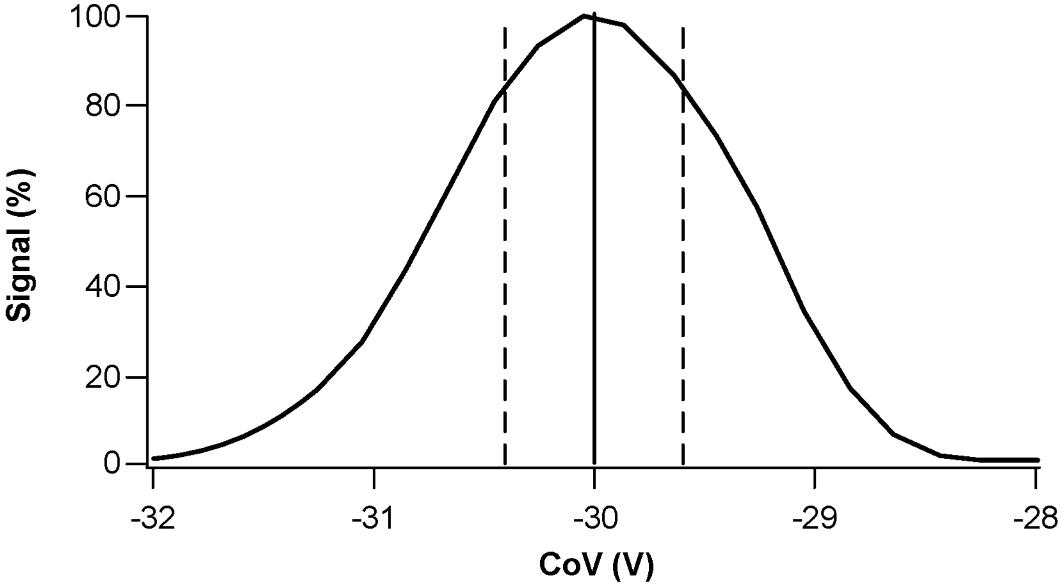
FIGS. 7 and 7A depict plots of a DMS CoV ramp for another standard compound.
Figure 7A:
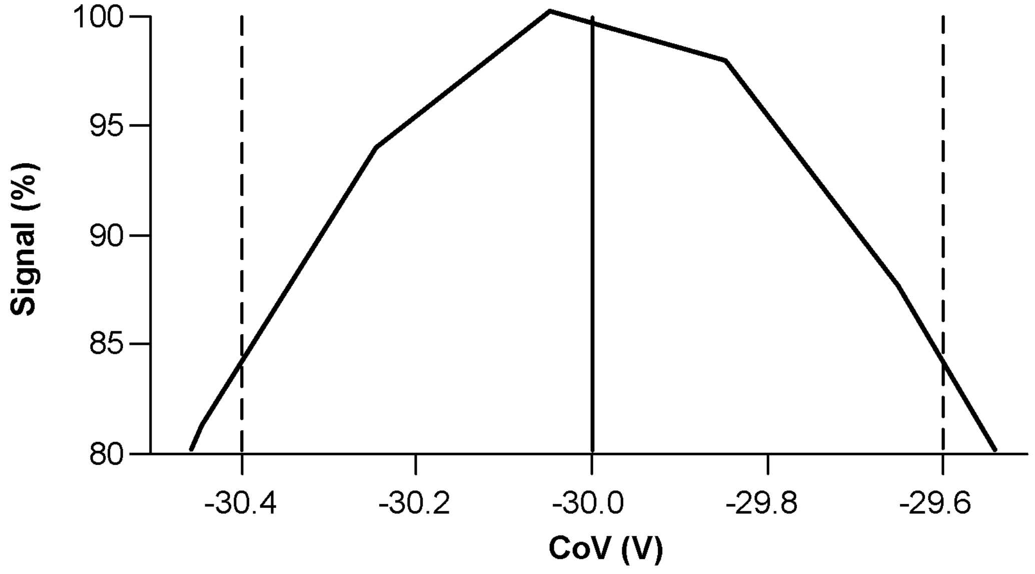

FIGS. 7 and 7A depict plots of a DMS CoV ramp for another standard compound, with FIG. 7A depicting the portion of the plot of FIG. 7 between 80 and 100% of the signal. In FIGS. 7 and 7A, a sample of interest was measured using isopropanol modifier and throttle gas. The throttle gas narrowed the DMS peak considerably (e.g., to about 1.7 V FWHM), tightening the CoV tolerance requirements. Once again, the solid vertical line shows the peak center. The dashed vertical lines show the signal that would be expected with a 0.4 V shift from optimum in either direction. In this case, a 0.4 V shift would be expected to yield approximately 16% signal reduction. This may represent too high of a signal reduction to be desirable, though the actual acceptable reduction may be defined as required or desired for a particular application. In certain applications, however, acceptable shift may be +/−0.3 V when running without modifiers and +/−0.4 V when running with modifiers. These specifications and the resulting changes to the alpha curve define the starting point for a defined suitability criteria. In other examples, shift of about +/−0.1 V, +/−0.2 V, +/−0.5 V, +/−0.8 V, and +/−1.0 V are anticipated. In general, signal reductions of less than about 20%, less than about 15%, less than about 12%, less than about 10%, less than about 8%, less than about 6%, and less than about 4% are acceptable.

Figure 8A:
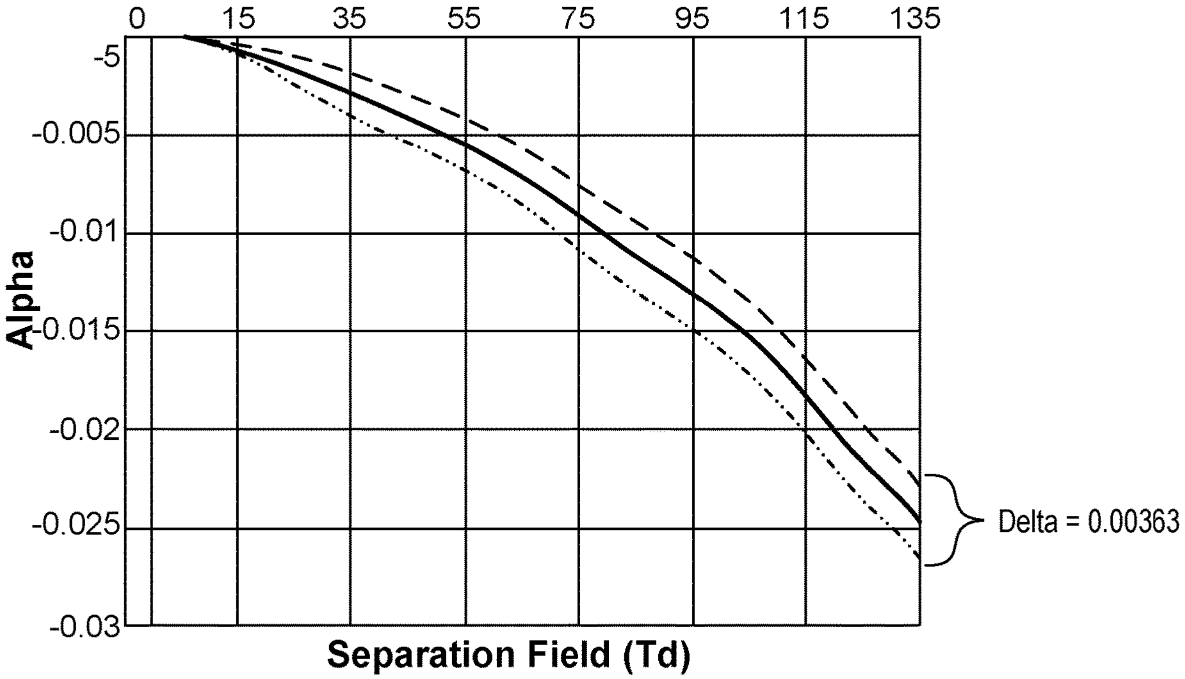
FIGS. 8A-8C depict alpha plots showing variability in alpha curves.
Figure 8B:
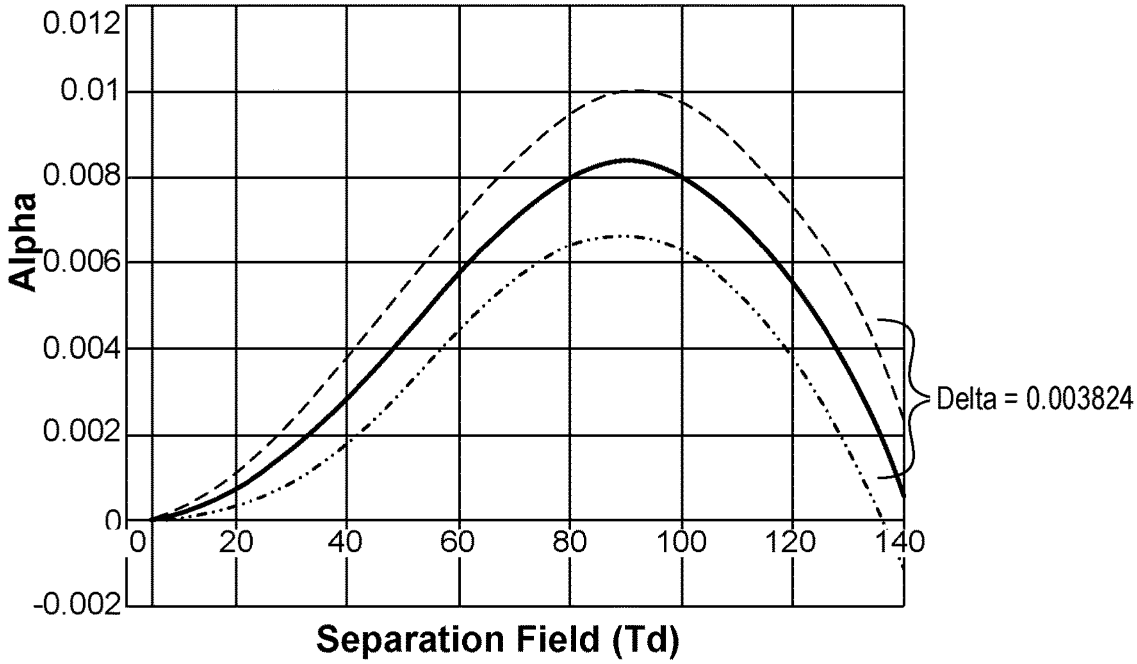
Figure 8C:
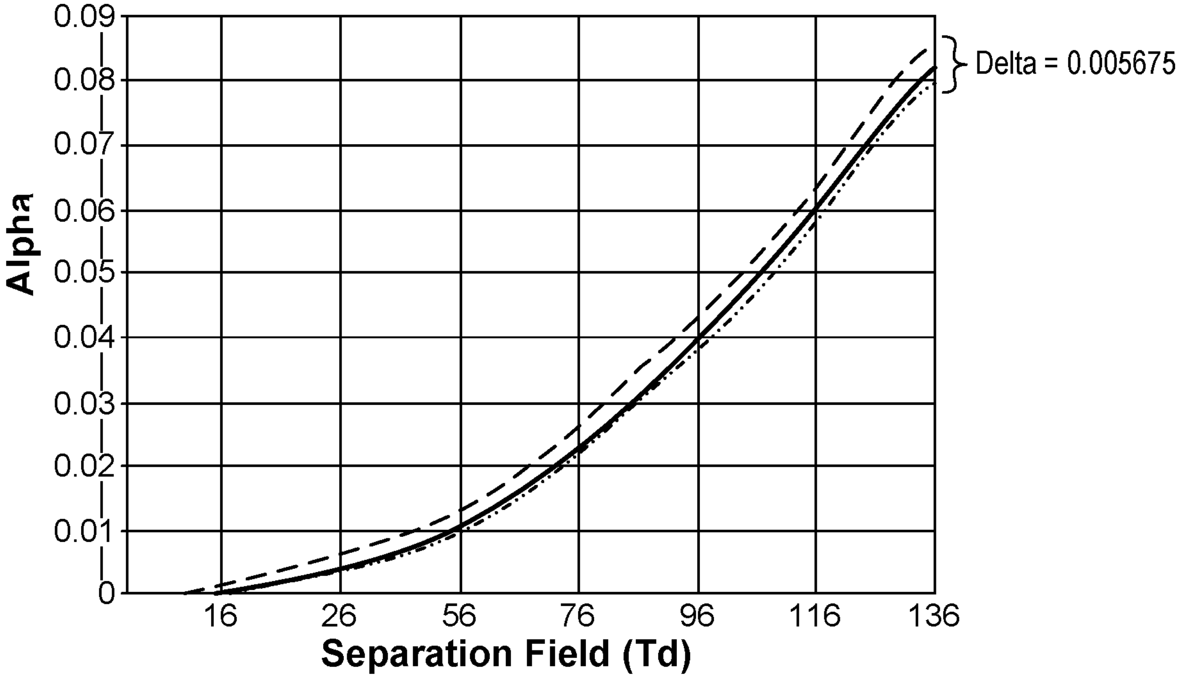

FIGS. 8A-8C depict alpha plots showing variability in alpha curves. Testing has determined a suitability specification for quantitative analysis for ions that display Type A, B, and C behavior in DMS. Ions that display Type A, Type B, and Type C behavior are known in the art and are described, for example, in Schneider et al., "Chemical Effects in the Separation Process of a DMS/MS System", Anal. Chem., 2010, 82, 1867-1880, the disclosure of which is hereby incorporated by reference herein in its entirety. Starting from a DMS specification of CoV stability with a range of +/−0.3 V, the impact on an alpha curve can be determined over the full range of variability. Beginning with a Type C ion, data is obtained for an average alpha curve. The CoV values are then modified higher and lower by an amount equal to 0.3 V at the extreme separation voltage and a value that was scaled by the ratio of separation field to maximum separation field. This is important for the fitting exercise because the SV=0 value for CoV must be 0 V. FIG. 8A shows an overlay of the three alpha curves generated with this process. The solid trace shows the average alpha data for the Type C compound, and the dashed and dotted traces show the elevated and reduced alpha curves, respectively. The worst case spread of the alpha values (for the +0.3 V curve and the −0.3 V curve) is 0.00363. Alpha variations smaller than this agree well with the library alpha functions.

FIG. 8B depicts alpha plots showing the variability that would be generated with a worst case deviation of +/−0.3 V in CoV space for a Type B ion. Similar to the previous data, the solid trace represents the average alpha data for this compound and the dashed and dotted traces were generated by augmenting and reducing the CoV values by a maximum of 0.3 V, respectively. Once again, the maximum spread in the absolute alpha values was 0.003824 for a full spread of 0.6 V in CoV space.

FIG. 8C depicts alpha plots showing the variability that would be generated with a worst-case deviation of +/−0.4 V in CoV space for a Type A ion. The increased allowance for CoV spread in this case gives a larger deviation for alpha. The maximum difference in the absolute alpha value is 0.005675 for a total spread of 0.8 V in CoV space. These results define the suitability criteria for alpha curves for quantitative analysis. An absolute deviation of alpha by greater than 0.0035-0.0057 could be considered sufficient to trigger an error. In the case of qualitative analysis, a larger deviation in alpha can be considered acceptable.

Figure 9:
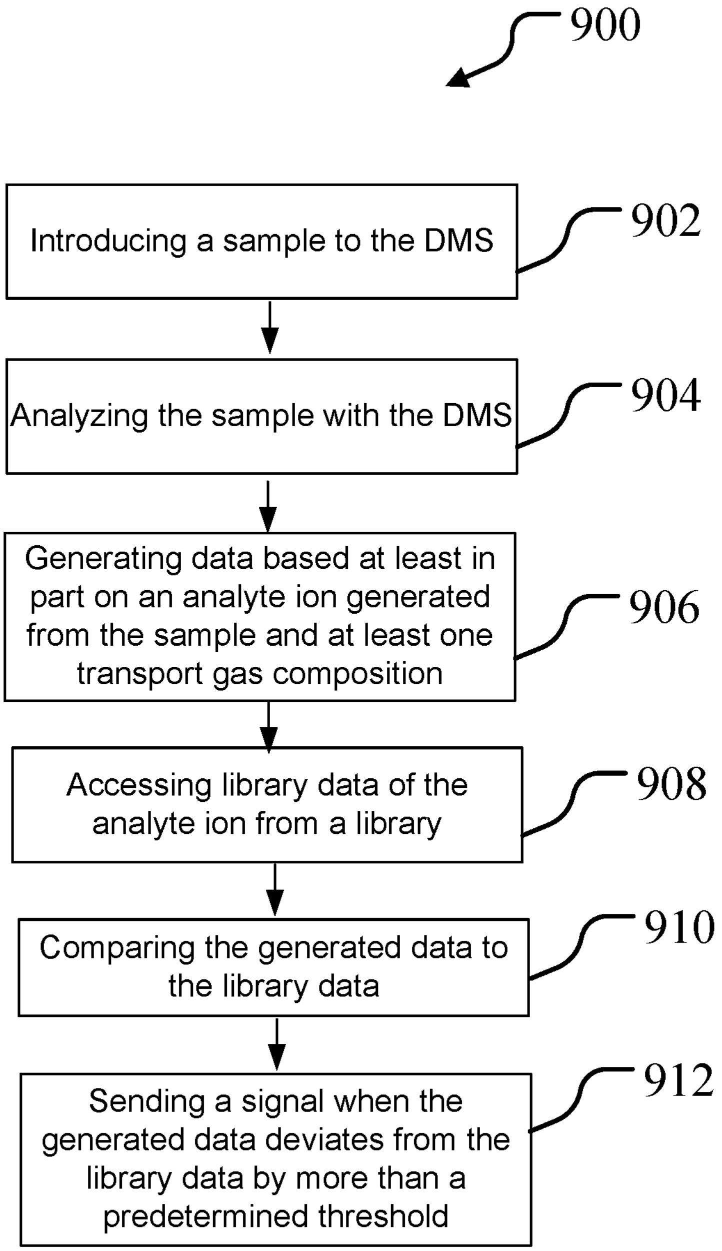
FIG. 9 depicts a method of operating a system including a DMS and an MS.

FIG. 9 depicts a method of operating a system including a DMS and an MS. The method begins with operation 902, introducing a standard sample to the DMS. The standard sample may be included amongst a plurality of subject samples, all in discrete wells of a well plate that acts as a sample source. A sample ejector (e.g., an ADE) may eject the standard sample, which may be received in an OPI. The received sample is aspirated to an ionization source such as an ESI, for ionization and delivery to the DMS, as described elsewhere herein. Flow continues to operation 904, analyzing the sample with the DMS. Operation 904 may include a number of other operational parameters to be set prior to analysis being performed. For example, an SV of the DMS may be set, and a CoV of the DMS may be ramped or adjusted. During adjustment of the CoV, an analytical signal from the DMS is monitored for each CoV value. Flow continues to operation 906, generating data based at least in part on an analyte ion generated from the standard sample with at least one transport gas composition. This generated data is derived from or based on the monitored analytical signal described above and may include generating a sample plot for each of a plurality of different SV settings of the DMS. Each sample plot may also include a mass spectrometer signal intensity displayed versus the CoV, such as depicted in FIGS. 6-7A.

In operation 908, library data of the analyte ion is accessed from a library and other database. This operation may include accessing a library alpha plot for the analyte ion at a predetermined transport gas condition. In operation 910, comparing the generated data associated with the standard sample to the library data is performed. This comparison may include transforming the sample plots into an experimental alpha plot, and comparing the experimental alpha plot to the library alpha plot. Such processes are described in Schneider et al., (BB Schneider et al., Mass Spectrom Rev, 2016, 35(6):687-737), the disclosure of which is incorporated by reference herein in its entirety. The method concludes with operation 912, sending a signal when the generated data deviates from the library data by more than a predetermined threshold. Various acceptable thresholds are described herein, but in certain applications, the predetermined threshold is a maximum absolute alpha difference between the experimental alpha plot and the library alpha plot, such that a shift in CoV space is less than 0.4 V.

The above method 900 is a general method of operating an MS system to determine the operational suitability of the DMS thereof. As noted elsewhere herein, this suitability test may be performed at any time before, during, or after analysis of other subject samples of a well plate. In that regard, a well plate may include a plurality of wells, only one of which includes the so-called “standard sample”. The well plate may also include a plurality of wells which include the “standard sample” or wells that contain more than one “standard sample”. In one example, the standard sample may be ejected and analyzed (e.g., and the method 900 performed) prior to any of the subject samples being ejected and analyzed. wherein such a method, ejection and testing of the subject samples is delayed until suitability of the DMS is confirmed. Such an order of operation may increase the time of throughput for a fully-loaded well plate. As such, the method 900 may be instead performed during ejection and analysis of subject samples of a well plate. For example, a plurality of subject samples may be ejected from the sample source after introducing the standard sample to the DMS. If operation 912 of the method 900 includes a signal that the DMS is not suitable for further testing, further ejection of the subject samples may be terminated, and any obtained results disregarded. Since the droplet of a subject sample ejected from a given well is of a minimal volume, analysis of the well plate may be performed after the DMS has been brought into proper operational conditions.

In another example, a first subset of subject samples are ejected from the sample source prior to introducing the standard sample to the DMS. This first subset of the plurality of ejected subject samples are analyzed with the DMS prior to introducing the standard sample to the DMS. A second subset of the plurality of subject samples are ejected from the sample source subsequent to introducing the standard sample to the DMS (and the performance of the method 900). If the method 900 determines that the DMS is not suitable for testing and analysis, ejection of the second subset of the plurality of subject samples is terminated. As such, an ejection termination signal may be the signal sent in operation 912.

Figure 10:
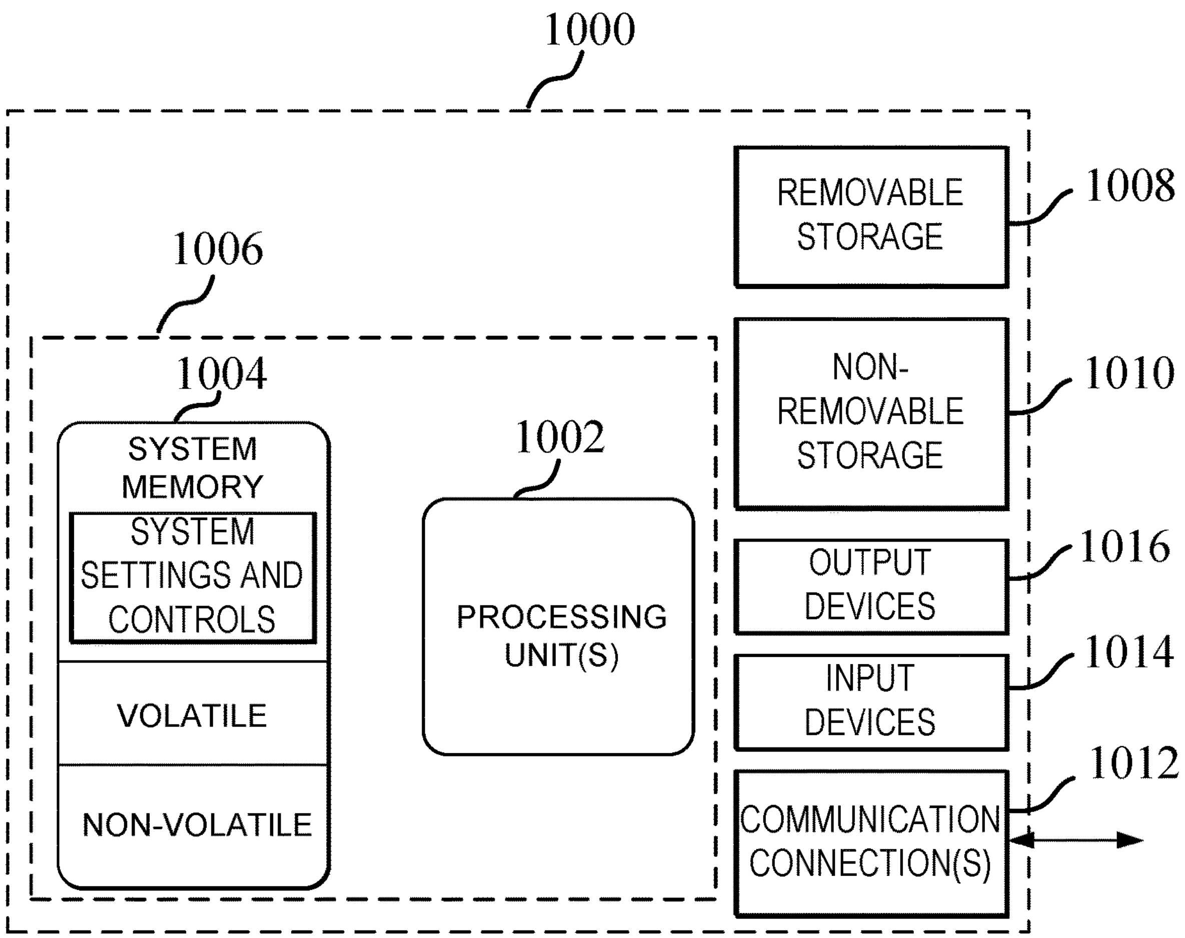
FIG. 10 depicts an example of a suitable operating environment in which one or more of the present examples can be implemented.

FIG. 10 depicts one example of a suitable operating environment 1000 in which one or more of the present examples can be implemented. This operating environment may be incorporated directly into the controller for a mass spectrometry system, e.g., such as the controller depicted in FIG. 4. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 1000 typically includes at least one processing unit 1002 and memory 1004. Depending on the exact configuration and type of computing device, memory 1004 (storing, among other things, instructions to eject the samples, perform analysis, obtain curves from a library or database, etc., or perform other methods disclosed herein) can be volatile (such as RAM), non-volatile (such as ROM, flash memory, etc.), or some combination of the two. This most basic configuration is illustrated in FIG. 10 by dashed line 1006. Further, environment 1000 can also include storage devices (removable, 1008, and/or non-removable, 1010) including, but not limited to, magnetic or optical disks or tape. Similarly, environment 1000 can also have input device(s) 1014 such as touch screens, keyboard, mouse, pen, voice input, etc., and/or output device(s) 1016 such as a display, speakers, printer, etc. Also included in the environment can be one or more communication connections 1012, such as LAN, WAN, point to point, Bluetooth, RF, etc.

Operating environment 1000 typically includes at least some form of computer readable media. Computer readable media can be any available media that can be accessed by processing unit 1002 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 1000 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by computer system 1000 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, computer system 1000 is part of a network that stores data in remote storage media for use by the computer system 1000.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of operating a system comprising a differential mobility spectrometer (DMS) and a mass spectrometer, the method comprising:
- introducing a standard sample to the DMS;
- analyzing the standard sample with the DMS;
- generating data based at least in part on an analyte ion generated from the standard sample and at least one transport gas composition;
- accessing library data of the analyte ion from a library;
- comparing the generated data to the library data;
- sending a signal, by a processor, when a difference between the generated data and the library data exceeds a predetermined threshold corresponding to a deviation in compensation voltage (CoV) space; and
- controlling operation of the DMS or sample introduction system based on the signal.

2. The method of claim 1, wherein analyzing the standard sample comprises:
- setting a separation voltage (SV) of the DMS;
- adjusting a CoV of the DMS; and
- while adjusting the CoV, concurrently monitoring an analytical signal from the DMS, wherein the generated data is based at least in part on monitoring the analytical signal.

3. The method of claim 1, wherein generating data comprises generating a sample plot for each of a plurality of different separation voltage settings of the DMS, wherein each sample plot comprises a mass spectrometer signal intensity versus the CoV.

4. The method of claim 3, wherein accessing library data comprises accessing a library alpha plot for the analyte ion at a predetermined transport gas condition.

5. The method of claim 4, wherein comparing the generated data to the library data comprises:
- transforming the sample plots into an experimental alpha plot; and
- comparing the experimental alpha plot to the library alpha plot.

6. The method of claim 5, wherein the predetermined threshold is a maximum absolute alpha difference between the experimental alpha plot and the library alpha plot such that a shift in CoV space is less than about 0.8 V.

7. The method of claim 5, wherein the predetermined threshold is a maximum absolute alpha difference between the experimental alpha plot and the library alpha plot such that a shift in CoV space is less than about 0.4 V.

8. The method of claim 1, further comprising:
- ejecting the standard sample with a droplet ejector into an open port interface (OPI); and
- aspirating the standard sample from the OPI to the ionization source.

9. A system for analyzing a sample, the system comprising:

a sample ejector for ejecting a standard sample from a sample source;

an open port interface (OPI) for receiving the ejected sample;

an ionization source communicatively coupled to the OPI;

a differential mobility spectrometer (DMS) disposed proximate the ionization source, wherein the ionization source is configured to deliver the sample to the DMS;

a mass spectrometer (MS);

a processor; and memory storing instructions that, when executed by the processor, cause the system to perform operations comprising:

introducing the standard sample to the DMS;

analyzing the standard sample with the DMS;

generating data based at least in part on an analyte ion generated from the standard sample and at least one transport gas composition;

accessing library data of the analyte ion from a library;

comparing the generated data to the library data;

sending a signal, by a processor, when a difference between the generated data and the library data exceeds a predetermined threshold corresponding to a deviation in compensation voltage (CoV) space; and controlling operation of the DMS or sample introduction system based on the signal.

10. The system of claim 9, wherein the sample ejector comprises an acoustic droplet ejector (ADE) and wherein the ADE is configured to eject a plurality of subject samples from the sample source.

11. The system of claim 9, wherein the operations further comprise mass analyzing each of the plurality of ejected subject samples with a mass spectrometer (MS) prior to introducing the standard sample to the DMS.

12. The system of claim 9, wherein the operations further comprise:

ejecting a first subset of the plurality of subject samples from the sample source prior to introducing the standard sample to the DMS;

mass analyzing the first subset of the plurality of ejected subject samples with the MS prior to introducing the standard sample to the DMS;

ejecting a second subset of the plurality of subject samples from the sample source subsequent to introducing the standard sample to the DMS; and terminating ejection of the second subset of the plurality of subject samples based at least in part on the sending of the signal.

13. The system of claim 9, wherein the operations further comprise:

ejecting the plurality of subject samples from the sample source subsequent to introducing the standard sample to the DMS; and terminating ejection of at least a subset of the plurality of subject samples based at least in part on the sending of the signal.

14. The system of claim 9, wherein the ionization source comprises an electrospray ionization source (ESI).

15. The system of claim 9, wherein the memory comprises the library.

16. The system of claim 9, wherein the sample source comprises a sample plate comprising a plurality of wells, and wherein the standard sample is disposed in a standard well of the plurality of wells.

17. The system of claim 9, further comprising receiving an identification signal associated with the standard well.

18. A method of operating a system comprising a differential mobility spectrometer (DMS) and a mass spectrometer, the method comprising:

generating a standard sample alpha curve based at least in part on an analyte ion generated from a standard sample and at least one transport gas composition;

comparing the standard sample alpha curve to a known alpha curve;

sending an operational condition signal, by a processor, based at least in part on the comparison; and controlling operation of the DMS or sample introduction system based on the operational condition signal.

19. The method of claim 18, wherein the operational condition signal comprises a warning.

20. The method of claim 18, wherein the operational condition signal initiates an introduction of a subject sample to the DMS.

* * * * *